US012713309B2

(12) United States Patent
Tchouankem et al.

(10) Patent No.: US 12,713,309 B2
(45) Date of Patent: Aug. 18, 2026

(54) DEVICE AND METHOD FOR MACHINE LEARNING IN A TELECOMMUNICATIONS NETWORK BASED ON RADIO CELLS

(71) Applicant: Robert Bosch Gmbh, Stuttgart (DE)

(72) Inventors: Hugues Narcisse Tchouankem, Hemmingen (DE); Maximilian Stark, Hamburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 318 days.

(21) Appl. No.: 18/540,239

(22) Filed: Dec. 14, 2023

(65) Prior Publication Data

US 2024/0214885 A1 Jun. 27, 2024

(30) Foreign Application Priority Data

Dec. 21, 2022 (DE) ..................... 10 2022 214 218.7

(51) Int. Cl.
*H04W 36/00* (2009.01)
*G06N 20/00* (2019.01)

(52) U.S. Cl.
CPC ...... *H04W 36/00833* (2023.05); *G06N 20/00* (2019.01); *H04W 36/0079* (2018.08)

(58) Field of Classification Search
CPC ....... H04W 36/00833; H04W 36/0079; G06N 20/00
USPC .......................................................... 455/436
See application file for complete search history.

(56) References Cited

U.S. PATENT DOCUMENTS 11,109,283 B1 * 8/2021 Kulkarni ............... H04W 24/02
2015/0237516 A1 * 8/2015 Michel .................. H04W 24/10 370/252
2022/0124574 A1 * 4/2022 Veggalam ............. H04W 24/02
(Continued)

FOREIGN PATENT DOCUMENTS

WO 2020014574 A1 1/2020
WO 2021/123285 A1 6/2021

OTHER PUBLICATIONS

"Mobileinsight: extracting and analyzing cellular network information on smartphones," Yuanjie Li, Chunyi Peng, Zengwen Yuan, Jiayao Li, Haotian Deng, Tao Wang, MobiCom '16: Proceedings of the 22nd Annual International Conference on Mobile Computing and Networking, Oct. 2016, pp. 202-215.

*Primary Examiner* — Michael R Neff
(74) *Attorney, Agent, or Firm* — NORTON ROSE FULBRIGHT US LLP

(57) ABSTRACT

A device and method for machine learning in a telecommunications network based on radio cells. A connection handover in the telecommunications network, in which a mobile terminal switches from one radio cell of the telecommunications network to another radio cell of the telecommunications network during a call connection or a data connection without interrupting this connection, is carried out as a function of a parameter. A series of observations of a property of a signal received by the mobile terminal in the telecommunications network is recorded. A series of observations of a signal, transmitted by a network device in the telecommunications network, for connection handover is recorded. A model for determining an estimated value for the parameter is determined as a function of the series of observations, and the estimated value is determined with the model.

14 Claims, 3 Drawing Sheets

(56) References Cited

U.S. PATENT DOCUMENTS

| | | | | |
|---|---|---|---|---|
| 2022/0286349 | A1* | 9/2022 | Pradhan | H04L 41/0636 |
| 2022/0386194 | A1* | 12/2022 | Mwanje | H04W 36/22 |

* cited by examiner 106
110
112
1
2
N
202-1
202-2
202-N
204-1
204-2
204-M
206-1
206-2
206-N
208-1
208-2
208-N

DEVICE AND METHOD FOR MACHINE LEARNING IN A TELECOMMUNICATIONS NETWORK BASED ON RADIO CELLS

BACKGROUND INFORMATION

PCT Patent Application No. WO 2020/014574 A1 describes a prediction of a most probable cause of an event in a telecommunications network.

FIELD

The present invention relates to a device and a method for machine learning in a telecommunications network based on radio cells.

SUMMARY

According to an example embodiment of the present invention, a method for machine learning in a telecommunications network based on radio cells provides that a connection handover in the telecommunications network, in which a mobile terminal switches from one radio cell of the telecommunications network to another radio cell of the telecommunications network during a call connection or a data connection without interrupting this connection, is carried out as a function of a parameter, wherein a series of observations of a property of a signal received by the mobile terminal in the telecommunications network is recorded, wherein a series of observations of a signal, transmitted by a network device in the telecommunications network, for connection handover is recorded, wherein a model for determining an estimated value for the parameter is determined as a function of the series of observations, and the estimated value is determined with the model. This means that in machine learning, the parameter that triggers the connection handover is estimated. The model represents a function for determining the estimated value for this parameter. The model is learned in data-based fashion using the series of observations. The method uses a hybrid approach in which domain knowledge of the telecommunications network, in particular of the 3GPP standard, for example according to release 16, and artificial intelligence are combined. Such standards allow a certain flexibility for manufacturer-specific use of parameters or deviations or extensions with regard to the parameters used in the respective standard. The latter cannot be represented by a static, non-trainable function without manufacturer-specific knowledge. In contrast, the method achieves very good results in estimating the parameter. Using it, the telecommunications network can be interpreted.

According to an example embodiment of the present invention, it is provided that a further series of observations of a property of a signal received by a further mobile terminal in the telecommunications network is recorded, wherein the estimated value for the parameter is determined as a function of the further series of observations. More data are available as a result. This further improves the result.

According to an example embodiment of the present invention, the model preferably comprises a set of parameters, wherein the set of parameters is learned as a function of the series of observations, wherein the estimated value is determined as a function of the set of parameters.

The RSRP and RSRQ values physically measured on the mobile terminal are an example of the series of observations of the property of the signal received by the mobile terminal.

According to an example embodiment of the present invention, preferably, it is provided that a prediction of a time of the connection handover is determined as a function of an observation of the property and as a function of the estimated value, wherein the time of the connection handover is recorded, and wherein the set of parameters is learned as a function of the prediction and the recorded time, or wherein, as a function of an observation of the property and as a function of the estimated value, a prediction of an occurrence or a non-occurrence of the connection handover is determined, wherein the occurrence or non-occurrence of the connection handover is recorded, and wherein the set of parameters is learned as a function of the prediction and the recorded occurrence or non-occurrence. The time, the occurrence or non-occurrence enable conclusions to be drawn about a strategy with which the connection handover takes place. This makes it possible to determine an estimate of the parameter with which the strategy can be reproduced particularly well. The prediction can comprise a binary classification which indicates whether the connection handover takes place, i.e., occurs, or not, i.e., is omitted. The prediction can comprise a time at which the connection handover takes place.

In one embodiment of the present invention, the estimated value and the parameter characterize a threshold value for a power of the signal, in particular a reference signal received power, RSRP, or a threshold value for an indicator for a field strength of the signal, in particular a received signal strength indicator, RSSI, or a threshold value for a ratio value of a value for a power of the signal and an indicator for a field strength of the signal, in particular a reference signal received quality, RSRQ.

In one embodiment of the present invention, the estimated value and the parameter characterize a threshold value for a difference between a quality of the connection from the mobile terminal to one of the radio cells and a quality of the connection from the mobile terminal to the other of the radio cells, in particular a hysteresis margin, HO margin.

In one embodiment of the present invention, the estimated value and the parameter characterize a threshold value for a counter for securing a successful connection handover, in particular a handover failure timer, T304. The counter starts, for example, when a request for a connection handover is made. After a time corresponding to the threshold value has elapsed, a new request for a connection handover is made, for example.

According to an example embodiment of the present invention, a device for machine learning in a telecommunications network based on radio cells is designed to carry out the method.

According to an example embodiment of the present invention, the device preferably comprises at least one interface for receiving signals which are transmitted in the telecommunications network by a mobile terminal or a network device, wherein the device comprises at least one computing device which is designed to execute instructions upon the execution of which the method runs, and wherein the device comprises at least one memory which is designed to store the instructions. This device has advantages that correspond to those of the method.

According to an example embodiment of the present invention, a computer program that comprises machine-readable instructions upon the execution of which by a computer the method runs has corresponding advantages.

Further advantageous embodiments of the present invention can be found in the following description and the figures.

DETAILED DESCRIPTION OF EXAMPLE EMBODIMENTS

Figure 1:
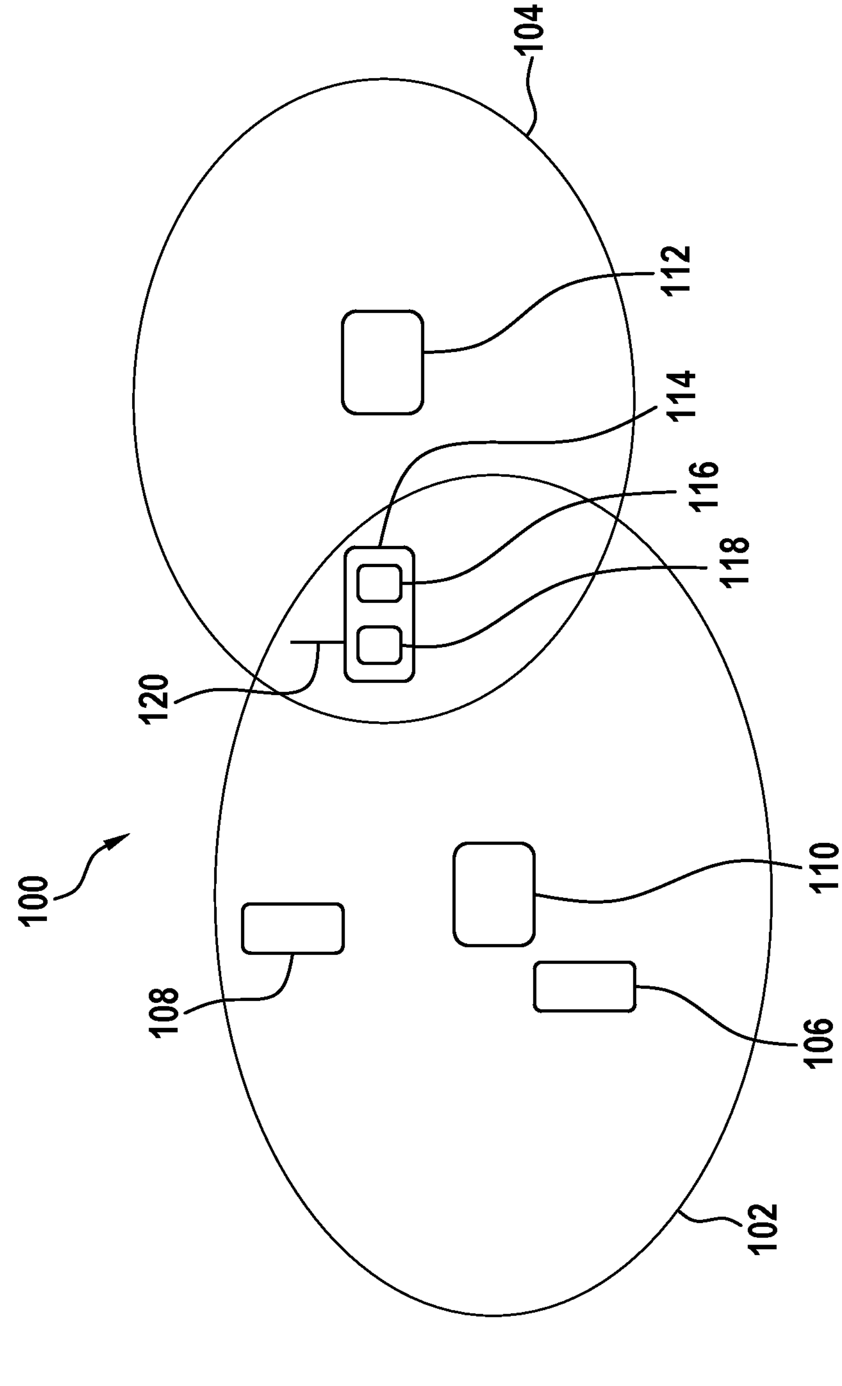
FIG. 1 shows a schematic representation of a part of a telecommunications network, according to an example embodiment of the present invention.

FIG. 1 schematically shows a telecommunications network 100 based on radio cells. The telecommunications network 100 comprises a plurality of radio cells, of which a first radio cell 102 and a second radio cell 104 are shown in FIG. 1.

In the example, the first radio cell 102 and the second radio cell 104 touch or overlap.

The telecommunications network 100 comprises a first mobile terminal 106. The first mobile terminal 106 is designed to receive and transmit signals in the telecommunications network 100. It may be provided that the telecommunications network 100 comprises a second mobile terminal 108. In the example, they are located in the first radio cell 102. The second mobile terminal 108 is designed to receive and transmit signals in the telecommunications network 100. The telecommunications network 100 comprises a first network device 110. The first network device 110 is designed to receive and transmit signals in the telecommunications network 100. In the example, the network device 110 comprises a first base station of the first radio cell 102. The first mobile terminal 106 is designed to communicate with the first network device 110 via a radio link to the first base station. The second mobile terminal 108 is designed to communicate with the first network device 110 via a radio link to the first base station. The telecommunications network 100 comprises a second network device 112. In the example, the second network device 112 comprises a second base station of the second radio cell 104. The second network device 112 is designed to communicate with the first mobile terminal 106 via a radio link to the second base station.

FIG. 1 schematically shows a device 114 for machine learning in a telecommunications network 100 based on radio cells.

The device 114 is designed to carry out a method described below.

The device 114 comprises at least one computing device 116 designed to execute instructions upon the execution of which by the device 114 the method runs. The device 114 comprises at least one memory 118 which is designed to store the instructions.

The device 114 comprises at least one interface 120 for receiving signals which are transmitted in the telecommunications network 100 by the first mobile terminal 106 or the first network device 110.

The first mobile terminal 106 is designed to detect a property of a signal received from the first network device 110 in the telecommunications network 100 by the first mobile terminal 106.

The first mobile terminal 106 is designed to detect a property of a signal received from the second network device 112 in the telecommunications network 100 by the first mobile terminal 106.

The first mobile terminal 106 is designed to transmit the property of the signal received by the first mobile terminal 106 in the telecommunications network 100 to the first network device 110 and the second network device 112.

In the example, the first network device 110 and/or the second network device 112 are designed to initiate a connection handover as a function of the property received from the first mobile terminal 106 or not to initiate a connection handover.

In the example, the second mobile terminal 108 is designed like the first mobile terminal 106. In the example, the first network device 110 and the second network device 112 are designed to observe the property of the signal received by the second mobile terminal 108 from the first network device 110 or from the second network device 112 as for the properties of the signal received by the first mobile terminal 106.

During the connection handover in the telecommunications network 100, the first mobile terminal 106 switches from, for example, the first radio cell 102 to the second radio cell 104 of the telecommunications network 100 during a call connection or a data connection without interrupting this connection. The connection handover is carried out as a function of a parameter. It may be provided that the parameter is multidimensional.

The parameter characterizes, for example, a power of the signal, in particular a reference signal received power, RSRP, at which the connection handover is to be carried out.

The parameter characterizes, for example, an indicator for a field strength of the signal, in particular a received signal strength indicator, RSSI, at which the connection handover is to be carried out.

The parameter characterizes, for example, a ratio value of a value for a power of the signal and an indicator for a field strength of the signal, in particular a reference signal received quality, RSRQ, at which the connection handover is to be carried out.

The parameter characterizes, for example, a difference between a quality of the connection from the first mobile terminal 106 to the first radio cell 102 and a quality of the connection from the first mobile terminal 106 to the second radio cell 104, in particular a hysteresis margin, HO margin, at which the connection handover is to be carried out.

The parameter characterizes, for example, a counter value of a counter to secure a successful connection handover, in particular a handover failure timer, T304, at which the connection handover is to be carried out. Possible counter values are 100 milliseconds, 200 milliseconds, 500 milliseconds, 1000 milliseconds, 2000 milliseconds, 4000 milliseconds, 8000 milliseconds.

The device 114 comprises a model for estimating the parameter. The model comprises a set of parameters. The set of parameters is trainable.

The model represents a function with which series of observations are mapped to an estimate of the parameter.

Taking into account the first mobile terminal 106, the function is, for example, $$x_t = f_\theta(Y_{UE1,t:N}, Y_{NE,t:N})$$

where $Y_{UE1,t:N}$ represents the series of observations of the property of the signal received by the first mobile terminal 106 and $Y_{NE,t:N}$ represents the series of observations of the signal transmitted by the first network device 110, as the input variable of the function. $x_t$ is the output variable of the function and represents the estimate for the parameter according to a first embodiment of the model. θ represents the set of parameters of the model in the first embodiment.

Additionally taking into account the second mobile terminal 108, the function is, for example, $$x_t = f_\theta(Y_{UE1,t:N}, Y_{UE2,t:N}, Y_{N,t:N})$$

where $Y_{UE2,t:N}$ represents the series of observations of the property of the signal received by the second mobile terminal 108.

In a second embodiment of the model, the model comprises an artificial neural network which is designed to approximate the function. In the second embodiment, the weights of the neural network represent the set of parameters of the model.

Figure 2:
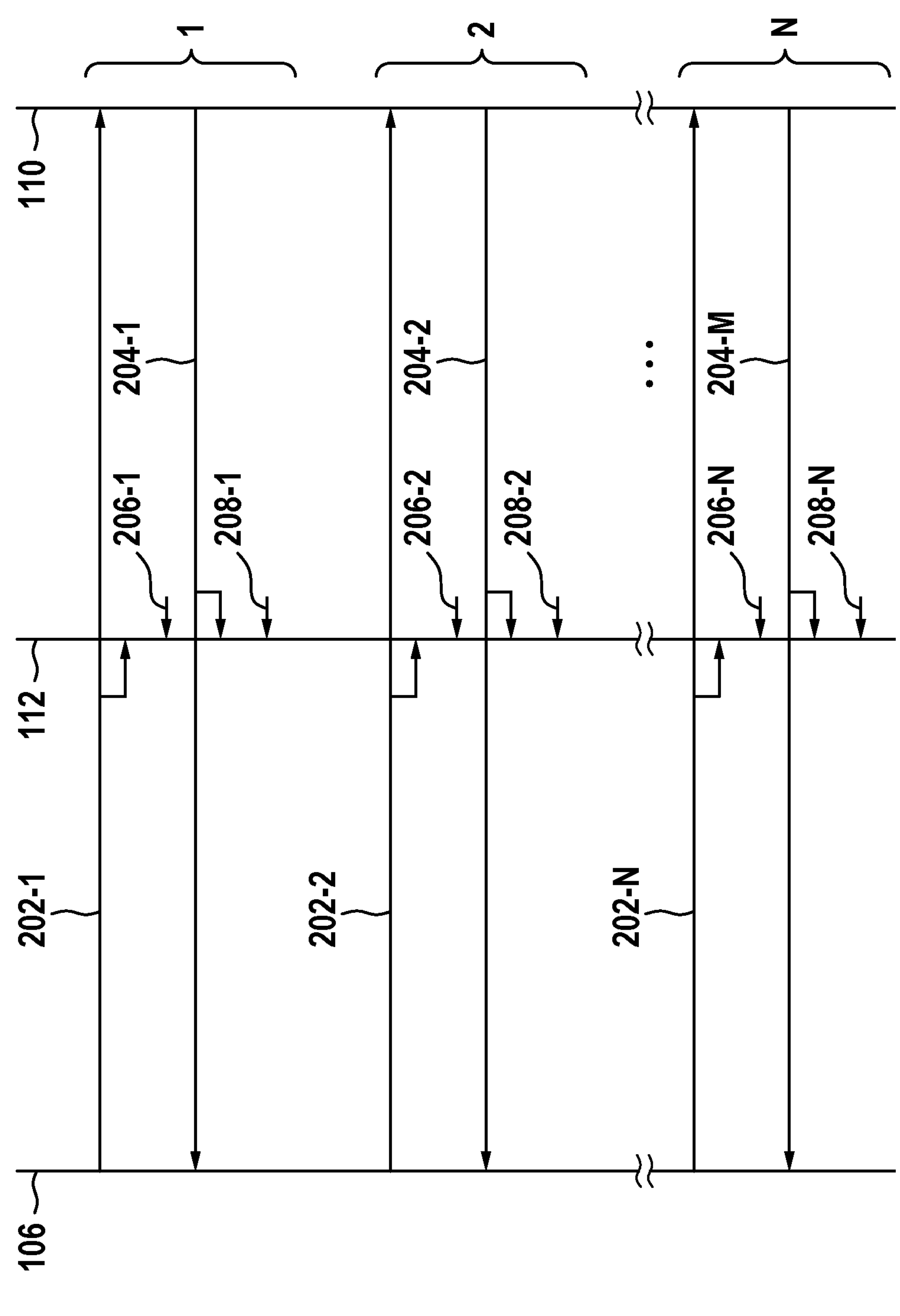
FIG. 2 shows a sequence diagram, according to an example embodiment of the present invention.

FIG. 2 shows a sequence diagram comprising steps in the method for machine learning. In the machine learning, the model, i.e., the set of parameters, is trained and used.

In the example, the first mobile terminal 106 is connected to the first network device 110 by a call connection or a data connection.

The method provides that a series of N observations 202-1, 202-2, . . . , 202-N of a property of the signal received by the first mobile terminal 106 is recorded. These observations are reported by the mobile terminal 106 to the first network device 110, for example with a signal. For example, this signal, which is transmitted by the first mobile terminal 106 in the telecommunications network 100, is recorded.

In the example, one of the following properties of the signal received by the first mobile terminal 106 is recorded:

- A power of the signal, in particular a reference signal received power, RSRP;
- An indicator for a field strength of the signal, in particular a received signal strength indicator, RSSI;
- A ratio of a value for a power of the signal and an indicator for a field strength of the signal, in particular a reference signal received quality, RSRQ;
- A difference between a quality of the connection from the first mobile terminal 106 to the first radio cell 102 and a quality of the connection from the first mobile terminal 106 to the second radio cell 104, in particular a hysteresis margin, HO margin;
- A counter value of a counter for securing a successful connection handover, in particular a handover failure timer, T304.

It may be provided that a plurality of these properties is recorded.

The method provides that a series of M observations 204-1, . . . , 204-M of a signal that the first network device 110 transmits in the telecommunications network 100 is recorded.

In the example, the signal that is comprised by the first network device 110 and characterizes an instruction to carry out the connection handover is recorded.

In a first training step 1, after a first observation 202-1 of the property of the signal received by the first mobile terminal 106, a first observation 204-1 of the signal transmitted by the first network device 110 is recorded.

In the first training step 1, a first prediction 206-1 for a first time 208-1 of the connection handover is determined, in particular by the device 112.

The first prediction 206-1 is determined as a function of the first observation 202-1 and a first estimated value, determined by the first model, for the parameter.

In the example, the model is trained in the first training step 1 with a first set of parameters, wherein the first estimated value is determined as a function of the first set of parameters.

In the first training step 1, the first time 208-1 of the connection handover is determined, in particular by the device 112.

In the example, the first time 208-1 of the connection handover is determined as a function of the first observation 204-1 of the signal transmitted by the first network device 110.

For example, a time at which a first instruction to carry out the connection handover is recorded is determined as the first time 208-1.

In the first training step 1, a second set of parameters is learned. The second set of parameters is learned, for example, as a function of the first prediction 206-1 and the first time 208-1.

In a second training step 2, after a second observation 202-2 of the property of the signal received by the first mobile terminal 106, a second observation 204-2 of the signal transmitted by the first network device 110 is recorded.

In the second training step 2, a second prediction 206-2 for a second time 208-2 of the connection handover is determined, in particular by the device 112.

The second prediction 206-2 is determined as a function of the second observation 202-2 and a second estimated value, determined by the first model, for the parameter.

In the example, the model is trained in the second training step 2 with the second set of parameters, wherein the second estimated value is determined as a function of the second set of parameters.

In the second training step 2, the second time 208-2 of the connection handover is determined, in particular by the device 112.

In the example, the second time 208-2 of the connection handover is determined as a function of the second observation 204-2 of the signal transmitted by the first network device 110.

For example, a time at which a second instruction to carry out the connection handover is recorded is determined as the second time 208-2.

In the second training step 2, a third set of parameters is learned. The third set of parameters is learned, for example, as a function of the second prediction 206-2 and the second time 208-2.

The method can provide only one, two, or more than two training steps. A further training step N is shown by way of example in FIG. 2.

In the training step N, after an Nth observation 202-N of the property of the signal received by the first mobile terminal 106, an Mth observation 204-M of the signal transmitted by the first network device 110 is recorded.

In the example, M and N are positive integer variables, and it is intended that M=N observations are recorded. It may be provided that not every one of the N observations or not every one of the M observations are used for the training.

In the training step N, an Nth prediction 206-N for an Nth time 208-N of the connection handover is determined, in particular by the device 112.

The Nth prediction 206-N is determined as a function of the Mth observation 202-M and an Nth estimated value, determined by the first model, for the parameter.

In the example, the model is trained in the training step N with a set of parameters that was determined in a previous training step N−1. In the example, the Nth estimated value is determined as a function of the N−1th set of parameters.

In the training step N, the Nth time 208-N of the connection handover is determined, in particular by the device 112.

In the example, the Nth time 208-N of the connection handover is determined as a function of the Mth observation 204-M of the signal transmitted by the first network device 110.

For example, a time at which an Mth instruction to carry out the connection handover is recorded is determined as the Nth time 208-N.

In the training step N, an Nth set of parameters is optionally learned. The Nth set of parameters is learned, for example, as a function of the Nth prediction 206-N and the Nth time 208-N.

For the model according to the first embodiment, the set of parameters of the function is determined, for example, with a parameter optimization, by which a deviation between the prediction and the recorded time is minimized. For the model according to the second embodiment, the set of parameters that represents the weights of the neural network is learned, for example using a gradient descent method, until the weights are determined for which a deviation between the prediction and the recorded time is smaller than a prespecified threshold.

Instead of recording and using the times for determining the predictions or the estimate or for learning the set of parameters, it may be provided to use one or more observations of the property. Instead of using the predictions for times to estimate or learn the set of parameters, it may be provided to use predictions of an occurrence or non-occurrence of the connection handover.

An application, e.g., MobileInsight, can be used to record the observations.

MobileInsight is described, for example, in: "Mobileinsight: extracting and analyzing cellular network information on smartphones," Yuanjie Li, Chunyi Peng, Zengwen Yuan, Jiayao Li, Haotian Deng, Tao Wang, MobiCom '16: Proceedings of the 22nd Annual International Conference on Mobile Computing and Networking, October 2016, pages 202-215, https://dl.acm.org/doi/10.1145/2973750.2973751.

Figure 3:
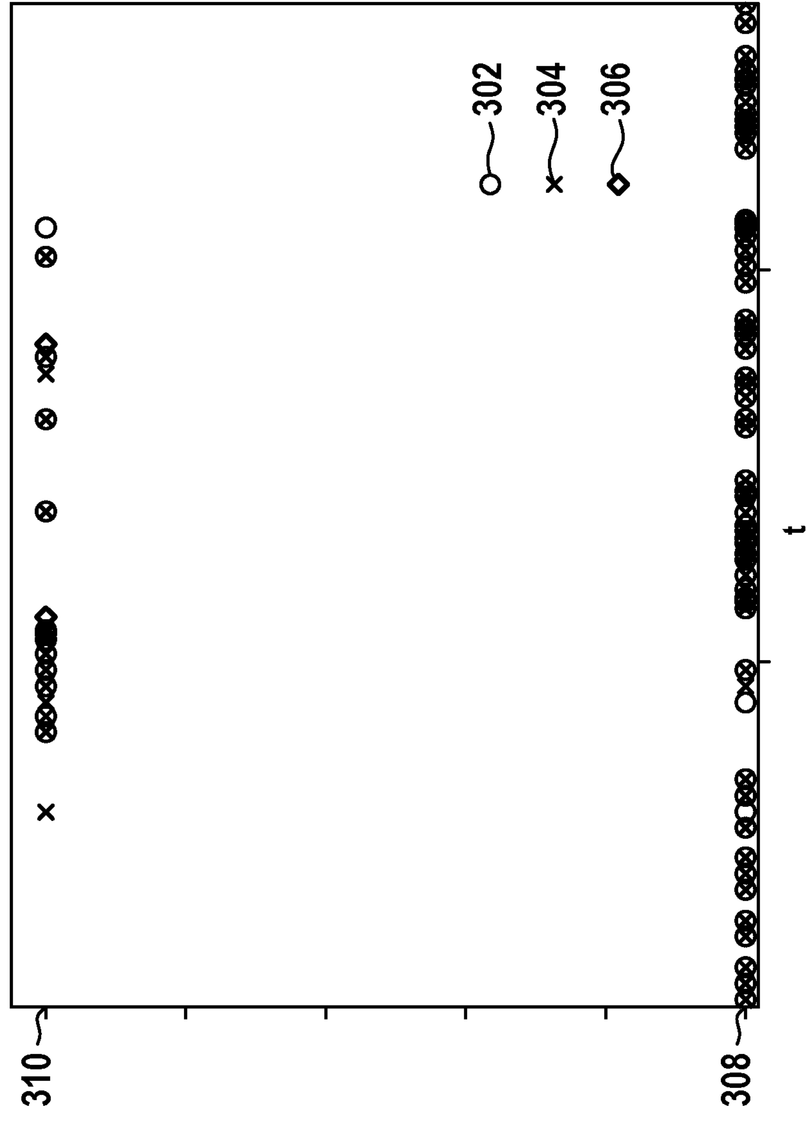

FIG. 3 shows an example of a connection handover between radio cells based on a movement of the first mobile terminal 106. In the example, the first mobile terminal 106 is connected in the first radio cell 102. FIG. 3 shows RSRP values 302 and RSRQ values 304 physically measured at the first mobile terminal 106 over time t, as well as times 306 at which the connection handover is initiated. In the example, a first value 308 is assigned to the respective RSRP value 302 if the first radio cell 102 has a better RSRP value 302 than the second radio cell 104. In the example, a second value 308 is assigned to the respective RSRP value 302 if the second radio cell 104 has a better RSRP value 302 than the first radio cell 102.

The RSRP and RSRQ values physically measured at the first mobile terminal 106 are an example of the series of observations of the property of the signal received by the first mobile terminal 106.

The invention claimed is:

1. A method for machine learning in a telecommunications network comprising radio cells, the method comprising:

recording a series of observations of a property of at least one signal received over a period of time by a mobile terminal in the telecommunications network;

recording a series of observations of at least one connection handover signal, transmitted over the period of time by a network device in the telecommunications network;

determining, a machine-learned model as a function of both of the recorded series of observations;

determining, using the determined machine-learned model, an estimated value of a handover parameter; and predicting, based on the estimated value of the handover timing parameter, a time of a connection handover in the telecommunications network in which the mobile terminal switches from one radio cell of the telecommunications network to another radio cell of the telecommunications network during an ongoing connection without interrupting the connection, wherein the connection is a call connection or a data connection.

2. The method according to claim 1, wherein a further series of observations of a property of a signal received by a further mobile terminal in the telecommunications network is recorded, wherein the estimated value for the parameter is determined as a function of the further series of observations.

3. The method according to claim 1, wherein the model includes a set of parameters, wherein the set of parameters is learned as a function of the series of observations, wherein the estimated value is determined as a function of the set of parameters.

4. The method according to claim 1, wherein the estimated value and the parameter characterize a threshold value for a difference between a quality of the connection from the mobile terminal to one of the radio cells and a quality of the connection from the mobile terminal to the other of the radio cells, including a hysteresis margin.

5. The method according to claim 1, wherein the estimated value and the parameter characterize a threshold value for a counter for securing a successful connection handover, including a handover failure timer.

6. The method according to claim 1, further comprising carrying out earlier instances of the connection handover during the period of time over which both of the series of observations are recorded.

7. The method according to claim 6, further comprising modifying the machine-learned model based on further observations of the property of the at least one signal received by the mobile terminal and of the at least one connection handover signal that are recorded after carrying out the instance of the connection handover, over a further period of time.

8. A method for machine learning in a telecommunications network based on radio cells, the method comprising:

recording a series of observations of a property of a signal received by a mobile terminal in the telecommunications network;

recording a series of observations of a connection handover signal transmitted by a network device in the telecommunications network;

determining a model, wherein the determining includes learning a set of model parameters of the model as a function of both of the series of observations;

estimating an estimated value of a handover parameter using the model as a function of the learned set of model parameters;

predicting, as a function of (i) an observation of the property and (ii) the estimated value, a time of a connection handover in the telecommunications network in which the mobile terminal switches from one radio cell of the telecommunications network to another radio cell of the telecommunications network during a connection without interrupting the connection, wherein the connection is a call connection or a data connection;

carrying out the connection handover as a function of the parameter;

recording a time at which the connection handover is, carried out; and:

modifying the set of parameters as a function of the predicted time and the recorded time.

9. The method according to claim 8, wherein: the estimated value and the parameter characterize: (i) a threshold value for a power of the signal including a reference signal received power (RSRP), or (ii) a threshold value for an indicator for a field strength of the signal, in particular a received signal strength indicator (RSSI), or (iii) a threshold value for a ratio value of a value for a power of the signal and an indicator for a field strength of the signal, in particular a reference signal received quality (RSRQ).

10. A device for machine learning in a telecommunications network based on radio cells, the device comprising:

a computer; and a computer-readable medium on which are stored instructions that are executable by the computer and that, when executed by the computer, cause the computer to perform a method, the method including the following steps:

recording a series of observations of a property of at least one signal received over a period of time by a mobile terminal in the telecommunications network;

recording a series of observations of at least one connection handover signal, transmitted over the period of time by a network device in the telecommunications network;

determining, a machine-learned model as a function of both of the recorded series of observations;

determining, using the determined machine-learned model, an estimated value of a handover parameter; and predicting, based on the estimated value of the handover timing parameter, a time of a connection handover in the telecommunications network in which the mobile terminal switches from one radio cell of the telecommunications network to another radio cell of the telecommunications network during an ongoing connection without interrupting the connection, wherein the connection is a call connection or a data connection.

11. The device according to claim 10, wherein the device further comprises:

at least one interface configured to receive signals which are transmitted in the telecommunications network by the mobile terminal or the network device.

12. A non-transitory machine readable medium on which is stored a computer program including machine-readable instructions, the instructions, when executed by a computer, causing the computer to perform the following steps:

recording a series of observations of a property of at least one signal received over a period of time by a mobile terminal in the telecommunications network;

recording a series of observations of at least one connection handover signal, transmitted over the period of time by a network device in the telecommunications network;

determining, a machine-learned model as a function of both of the recorded series of observations;

determining, using the determined machine-learned model, an estimated value of a handover parameter; and predicting, based on the estimated value of the handover timing parameter, a time of a connection handover in the telecommunications network in which the mobile terminal switches from one radio cell of the telecommunications network to another radio cell of the telecommunications network during an ongoing connection without interrupting the connection, wherein the connection is a call connection or a data connection.

13. A method for machine learning in a telecommunications network based on radio cells, the method comprising:

recording a series of observations of a property of a signal received by a mobile terminal in the telecommunications network;

recording a series of observations of a connection handover signal transmitted by a network device in the telecommunications network;

determining a model, wherein the determining includes learning a set of model parameters of the model as a function of both of the series of observations;

estimating an estimated value of a handover parameter using the model as a function of the learned set of model parameters;

predicting, as a function of (i) an observation of the property and (ii) the estimated value, whether there will occur a connection handover, in the telecommunications network and as a function of the handover parameter, in which the mobile terminal switches from one radio cell of the telecommunications network to another radio cell of the telecommunications network during a connection without interrupting the connection, wherein the connection is a call connection or a data connection;

recording whether the connection handover actually occurs; and modifying the set of parameters as a function of the prediction and the record of whether the connection handover actually occurred.

14. The method according to claim 13, wherein: the estimated value and the parameter characterize: (i) a threshold value for a power of the signal including a reference signal received power (RSRP), or (ii) a threshold value for an indicator for a field strength of the signal, in particular a received signal strength indicator (RSSI), or (iii) a threshold value for a ratio value of a value for a power of the signal and an indicator for a field strength of the signal, in particular a reference signal received quality (RSRQ).

* * * * *